April 17, 1956     D. R. DE BOISBLANC     2,741,918

VELOCITY TYPE FLOWMETER

Filed Nov. 28, 1949

INVENTOR.
D. R. DE BOISBLANC
BY Hudson & Young
ATTORNEYS

United States Patent Office 2,741,918
Patented Apr. 17, 1956

2,741,918

VELOCITY TYPE FLOWMETER

Deslonde R. de Boisblanc, Bartlesville, Okla., assignor to Phillips Petroleum Company, a corporation of Delaware Application November 28, 1949, Serial No. 129,856

9 Claims. (Cl. 73—194)

This invention relates to flowmeters.

Heretofore, instruments designed to measure flow at very low flow rates have oftentimes produced erroneous readings due to the density, viscosity, thermal conductivity, and other characteristics of the fluid. Difficulties have also been encountered where the instrument must measure fluid velocity over a wide range of temperatures since the aforementioned characteristics such as density, change quite rapidly with temperature and velocity of the fluid.

It is an object of this invention to provide a flowmeter which is free from the aforementioned difficulties.

It is a further object to provide a flowmeter in which the reading of the instrument depends, only to a negligible extent, upon the thermal conductivity, viscosity, density and other characteristics of the fluid to be measured.

It is a still further object to provide a flowmeter which is of rugged construction, simple in operation, and economical to build and manufacture.

Various other objects, advantages and features of the invention will become apparent to one skilled in the art from the following detailed description taken in conjunction with the appended drawings, in which.

In accordance with my invention, a surface of predetermined size is made to oscillate back and forth at a preselected frequency in the fluid whose velocity is to be measured. Thus, the viscose drag upon the surface is proportional to the static viscosity, density, and the relative velocity of the fluid with respect to the surface. Assuming that the static viscosity and density remain constant, or substantially so, during the period when flow is to be determined, it will be apparent that the viscous drag varies directly in accordance with the relative velocity of the fluid and the surface.

When the surface is moving in the direction of the fluid flow, it is evident that the relative velocity between the fluid and surface is decreased whereas, when the surface moves in a direction opposite to that of the fluid flow, the relative velocity between the fluid and surface is increased. That is to say, the reaction upon the element utilized to drive the surface is less when the surface is moving in the direction of fluid flow than when it is moving in the opposite direction. Assuming that the surface is moved in a periodic manner, the difference between the reaction upon the driving element as the surface moves in opposite directions is a function of the fluid velocity which may be utilized to produce a direct indication of fluid velocity. Where the surface is positioned at a preselected region of the fluid, the actual fluid velocity can be obtained exactly from the reaction upon the driving element if the velocity profile is known, or approximately if it is not known. In a modification of the invention, the measured velocity represents the actual velocity despite substantial variations in the velocity profile.

In particular, when electrical energy is utilized to drive the surface, the difference in motional impedance of the electrical driving element produces a dissymmetry between alternate half cycles of the voltage in the power line by which the electrical energy is transmitted, this dissymmetry manifesting itself as an increased second harmonic component in the voltage. Thus comparison of the strength of the second harmonic with the strength of the fundamental provides a resultant voltage which is a function of the velocity of fluid flow. Alternatively, other suitable means of comparing the reaction upon the driving element during alternate half cycles of movement of the surface may be employed without departing from the spirit and scope of the invention. For example, two surfaces which are driven 180 degrees out of phase produce changes in motional impedance in their driving elements such that the fluid velocity may be measured without measuring the strength of the second harmonic component.

Figure 1:
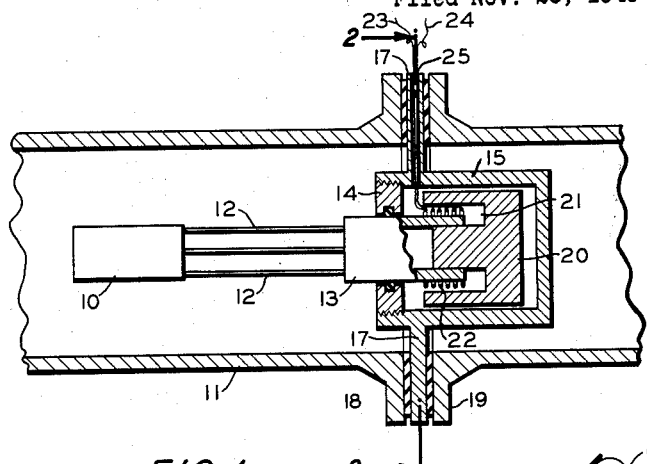
Figure 1 is a vertical, sectional view, partially in elevation, of a flowmeter constructed in accordance with this invention.
Figure 2:
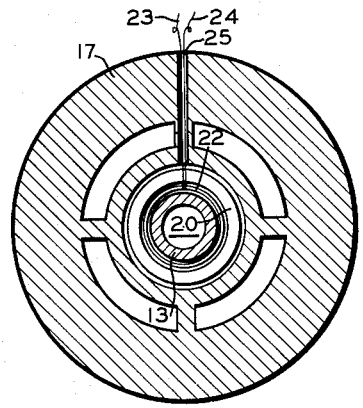
Figure 2 is a sectional view taken along the line 2—2 of Figure 1.

Referring now to Figures 1 and 2 wherein I have illustrated a specific embodiment of the invention, a thin cylindrical shell 10 is positioned in the path of flow of fluid through a conduit 11, the longitudinal axis of the shell preferably coinciding with the axis of the conduit. The shell 10 is supported by a series of rods 12 which, in turn, are carried by an armature 13 journalled in a plate 14, this plate forming a part of a fluid tight vessel 15 which is fixed in the conduit by a spider 17, the outer end of each spider member being carried between flanges 18, 19 of the conduit which are sealed by suitable gaskets. Mounted within the vessel 15 is a core 20 of magnetic material having an annular slot formed therein which carries a coil 22 together with the inner end of the armature 13. The coil is provided with leads 23, 24 extending through a slot 25 in the spider 17.

Figure 5:
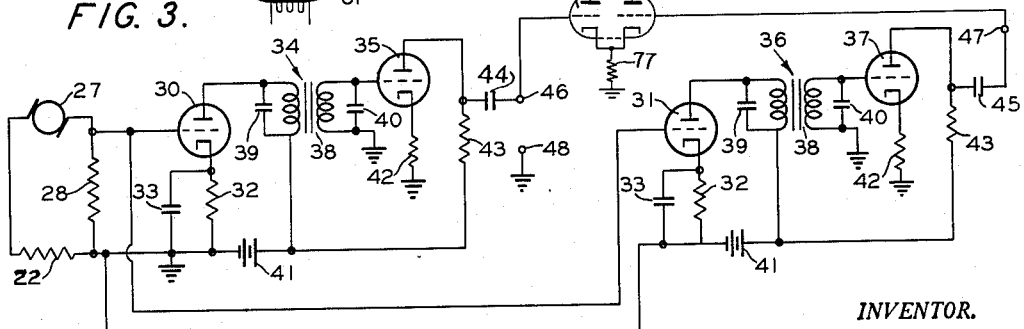
Figure 5 is a schematic circuit diagram of an amplifier unit associated with the flowmeter.

Referring now to Figure 5, the coil 22 is connected in circuit with an alternating current generator 27 and a fixed resistance 28. One terminal of resistance 28 is connected to the control grids of a pair of triodes 30, 31 and the other terminal of resistance 28 is grounded. The cathode of each tube 30, 31 is connected to ground through a bias resistor 32 which is shunted by a by-pass condenser 33. The anode of tube 30 is coupled by a filter 34 to the control grid circuit of a triode 35 and the anode of tube 31 is coupled by a filter 36 to the control grid circuit of a triode 37. Each of the filters includes a transformer 38 having its primary and secondary windings shunted, respectively, by condensers 39 and 40, the primary winding of each transformer also being connected in circuit with the anode of its corresponding tube and a power supply 41. The secondary winding of each transformer is connected between the control grid of its corresponding tube 35 or 37 and ground. The cathode of each tube 35, 37 is connected to ground through a bias resistor 42 while its anode is connected through a load resistor 43 to power source 41 through the respective coupling condensers 44, 45 to output terminals 46 and 47, a third output terminal 48 being grounded.

The filter 34 is tuned to the frequency of the alternating current supplied by power source 27 while the filter 36 is tuned to the second harmonic of this frequency with the result that the difference between the output voltages appearing across terminals 46, 48 and 47, 48 represents the relative strength of the second harmonic in the voltage wave produced in the circuit including current source 27 and coil 22. It will be evident that the voltage produced in coil 22 causes a reciprocating movement of armature 13, rods 12, and cylinder 10, the movement of the cylinder being opposed by the viscous drag of the fluid in conduit 11 upon the cylinder. Assuming that the fluid moves from left to right, Figure 1, the viscous drag upon cylinder 10 as it moves leftwardly is more than the viscous drag upon the cylinder when it moves in the opposite direction.

The difference between the reactions upon the driving element as the cylinder 10 moves in opposite directions is directly proportional to the velocity of fluid flow at the location of the cylinder in the conduit 11. If the velocity profile is known, the average fluid velocity may be immediately determined. Even if the fluid profile is not known, accurate results may be obtained by suitable calibration of the instrument. As previously stated, this difference in reaction produces a distorted wave form in the circuit consisting of current source 27, resistance 28 and coil 22, this distortion being manifested by an increase in the amplitude of the second harmonic of the voltage appearing across the resistor 28. As stated, the circuit of Figure 5 produces an output voltage representative of the second harmonic content of the voltage appearing across resistor 28 and, hence, this voltage is a function of the fluid velocity in the conduit 11. By suitable calibration of an indicating device attached to output terminals 46, 47, 48 a meter reading may be produced which directly indicates the flow velocity in the conduit at the location of cylinder 10. Suitable voltage comparison circuits are well known in the art. For example, the balanced amplifier illustrated and described in Electronic Instruments, Greenwood, Holdam and Macrae, McGraw-Hill Book Company, Inc., New York, 1948, p. 512, Fig. 15–20(c) can be so employed to compare the voltage between terminals 46, 48 with the voltage between terminals 47, 48. This balanced amplifier includes a pair of triodes 75 and 76 having their respective control grids connected to terminals 46 and 47. The cathodes of triodes 75 and 76 are grounded through a common resistor 77 and the respective anodes are connected to a source of operating voltage through resistors 79 and 80. A galvanometer 81 connected between the anodes of triodes 75 and 76 gives a reading which is proportional to the difference in voltage applied to the control grids thereof. Of course, any other suitable device may be utilized to measure the difference between the reaction of cylinder 10 upon the driving element as it moves in the direction of fluid flow, as compared with the reaction as it moves in the opposite direction.

Figure 3:
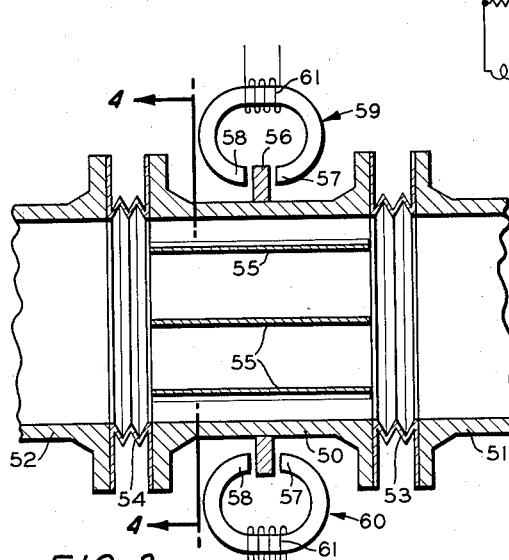
Figure 3 is a vertical, sectional view of a modified form of flowmeter.
Figure 4:
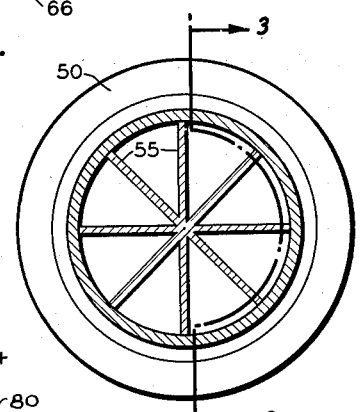
Figure 4 is a sectional view taken along the 4—4 of Figure 3.

Referring now to Figures 3 and 4, I have shown a modified form of the flowmeter of my invention. This structure includes a flanged cylindrical member 50 mounted between two adjacent conduit sections 51, 52 by bellows 53 and 54. The cylinder 50 has a number of diametrically arranged baffles 55 disposed therein to increase the viscous drag of the fluid upon the structure of the cylinder. It will be apparent that the cylinder 50 is movable longitudinally, to a limited extent, between the conduit sections 51, 52. Mounted upon the cylinder 50 is an annular ring or armature 56 of magnetic material with which cooperate pole pieces 57, 58 of a plurality of magnetic cores 59 and 60, each core having a coil 61 wound thereon.

The flowmeter of Figures 3 and 4 operates in a manner very similar to the flowmeter of Figures 1 and 2 in that an alternating current applied to coils 61 causes an oscillatory longitudinal movement of the cylinder 50. When fluid is flowing through the conduit sections 51, 52 the viscous drag upon the cylinder 50 is less when it is moving in the direction of the fluid flow than when it is moving in the opposite direction. As a result, the reaction upon the driving element as cylinder 50 moves in the direction of fluid flow is less than that produced when it moves in the opposite direction. This difference in reaction is determined in any suitable manner as, for example, by the circuit of Figure 5. The diametric baffles 55 produce an integrating effect which enables the average velocity of the fluid to be measured directly, the measurement being substantially independent of the velocity profile in the conduit. That is, an accurate measurement may be obtained even when the flow through the conduit is turbulent.

Figure 6:
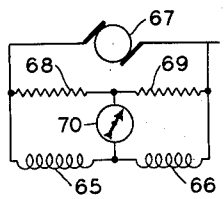
Figure 6 is a schematic circuit diagram of a modification of the invention.

In the modification of the invention shown by Figure 6, two separate measuring devices are utilized, either of the type shown by Figure 1 or of the type shown by Figure 3. These two measuring devices are positioned within a common conduit whose fluid flow is under measurement. Current supplied from a common alternating current source 67 drives both measuring devices for oscillations within the fluid 180 degrees out of phase with one another. This is accomplished in the following manner: coil 65 represents driving coil 22 if a first measuring device as shown in Figure 1 is employed, or said coil 65 represents the plurality of driving coils 61 if a first measuring device as shown in Figure 3 is employed; coil 66 in like manner represents corresponding driving coils of the second measuring device. The coils on the two measuring devices are wound in opposite directions whereby one of said devices moves with the fluid flow and the other moves against the flow when current from source 67 is applied to the two coils. Coils 65 and 66 together with balancing resistors 68 and 69, current source 67, and alternating current meter 70 are connected in bridge arrangement so that any unbalance indicated on meter 70 represents the average fluid velocity in the conduit when the structure of Figure 3 is used and the fluid velocity at the element of area occupied by cylinder 10 if the structure of Figure 1 is utilized, the portion of the output representing viscous drag being cancelled out by the bridge circuit since the two devices move in opposition to one another. Accordingly, the amplitude of the second harmonic need not be measured in this modification.

While the invention has been described in connection with a present, preferred embodiment thereof, it is to be understood that this description is illustrative only and is not intended to limit the invention, the scope of which is defined by the appended claims.

I claim:

1. A flowmeter comprising, in combination, a pair of spaced conduit sections, a cylindrical member mounted between said conduit sections, a series of spaced radially-extending baffles in said member, said baffles extending substantially lengthwise of said member to present edges to the fluid flow through said member, bellows means connecting the respective ends of said cylindrical member to the adjacent conduit sections, an annular armature of magnetic material mounted on said cylindrical member, a plurality of magnetic cores each having a pair of spaced pole pieces disposed adjacent said armature, and a coil wound on each of said cores.

2. A flowmeter assembly comprising a pair of flowmeters constructed in accordance with claim 1, said two flowmeters being connected in series relation in a path of fluid flow to be measured, the coils on each of said cores in the first of said flowmeters being connected in series relation to form a first impedance element, the coils on each of said cores in the second of said flowmeters being connected in series relation to form a second impedance element, means for passing alternating current through each of said impedance elements, the coils of said impedance elements being disposed in relation to said armatures whereby said two cylindrical members are moved in a reciprocatory manner 180° out of phase with one another with respect to the direction of fluid flow, and means for comparing the current flows through each of said impedance elements.

3. A flowmeter comprising, in combination, a conduit adapted to pass a fluid stream, a coil, an armature disposed adjacent said coil and movable with respect thereto, a movable element attached to said armature for movement therewith, said element having a surface disposed within said conduit in engagement with fluid in said conduit and extending in the direction of fluid flow through said conduit, means for passing an alternating current of a first frequency through said coil to effect reciprocatory movement of said armature whereby said surface is moved alternately in the direction of fluid flow through said conduit and in a direction opposite to the direction of fluid flow through said conduit, and circuit means including said coil to measure the relative amplitudes of currents of said first frequency and of a frequency twice said first frequency flowing through said coil.

4. A flowmeter in accordance with claim 3 in which said movable element comprises a thin cylindrical shell, the axis of said shell coinciding with the direction of fluid movement through said conduit.

5. A flowmeter comprising, in combination, a pair of units each having a surface adapted to engage a fluid whose velocity is to be determined, each of said units being formed at least in part of magnetic material, a coil of electrically conductive material disposed adjacent each of said units whereby current flow through said coils results in movement of the surfaces of respective ones of said units longitudinally of the direction of fluid flow under measurement, means for passing alternating current through each of said coils, said coils being disposed in relation to respective ones of said units whereby said surfaces are moved in a reciprocatory manner 180° out of phase with one another with respect to the direction of fluid flow, and means for comparing the current flows through each of said coils.

6. A flowmeter in accordance with claim 5 in which each of said units comprises a thin cylindrical shell, the axes of said shells coinciding with the direction of the fluid flow under measurement.

7. A flowmeter comprising, in combination, a pair of units each having a surface adapted to engage a fluid whose velocity is to be determined, each of said units being formed at least in part of magnetic material, a coil of electrically conductive material disposed adjacent each of said units whereby current flow through said coils results in movement of the surfaces of respective ones of said units longitudinally of the direction of fluid flow under measurement, a pair of impedance elements connected in a Wheatstone bridge circuit with said coils, a source of alternating current applied across opposite first terminals of said bridge circuit, said coils being disposed in relation to respective ones of said units whereby said surfaces are moved in a reciprocatory manner 180° out of phase with one another with respect to the direction of fluid flow, and current indicating means connected across the second opposite terminals of said bridge circuit.

8. A flowmeter comprising a fluid tight vessel, a conduit adapted to convey a fluid, means mounting said vessel within said conduit, a core of magnetic material positioned within said vessel, said core having an annular slot therein, a coil mounted within said slot, an armature having a portion thereof formed of magnetic material and extending through sealing means in one wall of said vessel to engage said slot for longitudinal movement therein, a support rod extending from said armature within said conduit, a thin cylindrical element carried by said rod, the axis of said element coinciding with the axis of said conduit, means supplying alternating current to said coil, said coil and said armature being positioned within said conduit so that said element is moved along its axis alternately in the direction of fluid flow through said conduit and in a direction opposite the direction of fluid flow through said conduit, and circuit means including said coil to measure the differences in impedance of said coil during alternate half cycles of the reciprocatory movement of said armature, said differences in impedance being representative of fluid flow through said conduit.

9. A flowmeter comprising a pair of spaced conduit sections positioned substantially coaxial of one another, a cylindrical member mounted between said conduit sections, flexible sealing means connecting the respective ends of said cylindrical member to the adjacent conduit sections, an armature of magnetic material mounted on said cylindrical member, and a coil mounted adjacent said armature so that said cylindrical member is moved periodically in opposite directions parallel to the common axis of said conduit sections by the application of alternating current to said coil.

References Cited in the file of this patent
UNITED STATES PATENTS

| | | |
|---|---|---|
| 2,047,713 | Simpson | July 14, 1936 |
| 2,076,195 | Fickel | Apr. 6, 1937 |
| 2,142,854 | Pierre | Jan. 3, 1939 |
| 2,633,016 | Millington | Mar. 31, 1953 |

OTHER REFERENCES

Schad, Abstract of Application Serial No. 167,824, pub. August 21, 1951, 649 O. G. 691.